United States Patent
Yamaguchi et al.

(10) Patent No.: US 6,985,737 B2
(45) Date of Patent: Jan. 10, 2006

(54) COMMUNICATION CHANNEL SETTING METHOD, COMMUNICATION CONTROLLER, AND RADIO COMMUNICATION SYSTEM

(75) Inventors: Koichiro Yamaguchi, Yokohama (JP); Yuji Aburakawa, Yokohama (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 604 days.

(21) Appl. No.: 10/219,285

(22) Filed: Aug. 16, 2002

(65) Prior Publication Data

US 2003/0045282 A1 Mar. 6, 2003

(30) Foreign Application Priority Data

Aug. 28, 2001 (JP) ........................... 2001-258586

(51) Int. Cl.
*H04Q 7/20* (2006.01)

(52) U.S. Cl. .................... 455/450; 455/424; 455/452.1; 455/73

(58) Field of Classification Search ...... 455/450–452.2, 455/522–525, 73, 78, 115.1–115.4, 226.1–226.4, 455/423–424, 67.11
See application file for complete search history.

(56) References Cited

U.S. PATENT DOCUMENTS

| | | | | |
|---|---|---|---|---|
| 3,806,804 A | * | 4/1974 | Mills et al. | 455/509 |
| 5,450,623 A | * | 9/1995 | Yokoyama et al. | 455/226.1 |
| 5,475,864 A | * | 12/1995 | Hamabe | 455/452.2 |
| 5,802,446 A | * | 9/1998 | Giorgi et al. | 455/69 |
| 5,926,501 A | * | 7/1999 | Souissi et al. | 375/131 |
| 6,009,332 A | | 12/1999 | Haartsen | |
| 6,535,766 B1 | * | 3/2003 | Thompson et al. | 607/60 |
| 2002/0118733 A1 | * | 8/2002 | Frenkel | 375/219 |

FOREIGN PATENT DOCUMENTS

| | | |
|---|---|---|
| CN | 1127059 | 7/1996 |
| WO | WO 98/02010 | 1/1998 |
| WO | WO 98/59511 | 12/1998 |

* cited by examiner

*Primary Examiner*—Duc Nguyen
(74) *Attorney, Agent, or Firm*—Oblon, Spivak, McClelland, Maier & Neustadt, P.C.

(57) ABSTRACT

A frequency band controlling part 107 determines a frequency band assignable to a transmission line according to the frequency, bandwidth, and the power of the interference wave at a base station 200 by means of a supplied control signal from a separating part 105. The frequency band controlling part 107 selects a frequency band for the transmission line and a frequency band for the reception line for the base station 200 according to this assignable frequency band contained in the control signal.

16 Claims, 11 Drawing Sheets

FREQUENCY BANDS USED
IN A NETWORK OF BASE STATIONS

FREQUENCY BANDS USED
IN A NETWORK OF BASE STATIONS

COMMUNICATION CHANNEL SETTING METHOD, COMMUNICATION CONTROLLER, AND RADIO COMMUNICATION SYSTEM

CROSS REFERENCE TO RELATED APPLICATION

This application is based upon and claims the benefit of priority from the prior Japanese Patent Application No. P2001-258586, filed on Aug. 28, 2001; the entire contents of which are incorporated herein by reference.

BACKGROUND OF THE INVENTION

1. Field of the Invention

The present invention relates to a communication channel setting method, a communication controller, and a radio communication system, which set a communication channel between radio base stations.

2. Description of the Related Art

As a technique of realizing a full duplex communication between radio stations in a radio communication system, there is known a frequency division full duplex communication, which uses different frequencies for a transmission line and a reception line.

In such a conventional radio communication system, for example, as illustrated in FIG. 1, the frequency band used for radio lines is divided, for example, into two frequency bands, i.e. a low frequency group and a high frequency group with a guard band which is set in between. And, it is arranged that a frequency band is assigned to a radio line for transmission (transmission line) and to a radio line for reception (reception line) by paired channels which correspond to the low frequency group and the high frequency group, respectively. In FIG. 1, the symbols A to E and the symbols A' to E' each represent a radio line, and each arrow represents a band which is assigned to each radio line. The A and A', B and B', etc. each represent paired channels in the low frequency group and the high frequency group which are used for the transmission line and for the reception line, respectively.

In addition, in the conventional radio communication system, the bandwidth of the frequency band (the bandwidth of the channel) which is assigned to each radio line was made fixed regardless of the amount of information which was forwarded to the radio line.

However, in the conventional radio communication system, it is common that the frequency for the channel for the transmission line and the frequency for the channel for the reception line were managed as one pair having a fixed relationship (e.g. the frequency for the transmission line=the frequency for the reception line+the shifted frequency) in order to simplify the configuration of the radio station, etc.

In this case, only in a case where both the channel for the transmission line and the channel for the reception line are usable, can these paired channels be used as communication channels. Therefore, as illustrated in FIG. 2 for example, in a case where any one of the channels cannot be used, that pair cannot be used. That is, although in each of a channel X1 and a channel X3 the received power of the interference wave is smaller than a prescribed threshold and can be used as the transmission line in the band of the low frequency group, only a channel X3' can be used as the reception line in the band of the high frequency group due to the level of received power of the interference wave. The result is that the channel X1 cannot be used as the transmission line and therefore only paired channels X3 and X3' can be used as the communication channels.

In a case where, as in the case of a network for radio base stations, a number of radio lines exist on the same plane, since in many cases the interference which the transmission radio line receives and that the reception radio line receives become asymmetric due to fading having frequency dependency, for example, multi-path fading, and a directional antenna used at the base stations, the assignment of a channel pair by the method as mentioned above is not able to achieve an effective assignment. This raises the problem that frequency utilization efficiency of the system is decreased.

Further, in the above-described radio communication system, since the acquisition of the bandwidth of the channel is fixed, the channel always occupies the entire prescribed bandwidth even when the amount of information to be forwarded is very small. For this reason, there was the need to improve the method for the channel assignment to enhance frequency utilization efficiency.

BRIEF SUMMARY OF THE INVENTION

It is therefore an object of the present invention to provide a communication channel setting method, a communication controller, and a radio communication system each of which can contribute to enhancing frequency utilization efficiency.

According to the first aspect of the present invention, there is provided a communication channel setting method for setting a communication channel used for communication between radio base stations, comprising the steps of: (A) measuring a noise level in a transmission band which can be used for communication from a first radio base station to a second radio base station; (B) selecting a transmission channel in the transmission band in which the measured noise level is lower than a prescribed threshold; (C) measuring a noise level in a reception band which can be used for communication from said second radio base station to said first radio base station; (D) selecting a reception channel in the reception band in which the measured noise level is lower than a prescribed threshold; and (E) determining said transmission channel and said reception channel independently.

This communication channel setting method measures a noise level in a transmission band which can be used for communication from a first radio base station to a second radio base station, selects a transmission channel in the transmission band in which the measured noise level is lower than a prescribed threshold, measures a noise level in a reception band which can be used for communication from said second radio base station to said first radio base station, and selects a reception channel in the reception band in which the measured noise level is lower than a prescribed threshold.

According to the second aspect of the present invention, there is provided a communication controller for setting a communication channel used for communication between radio base stations, comprising: a first noise level measuring unit configured to measure a noise level in a transmission band which can be used for communication from a first radio base station to a second radio base station; a transmission channel selector for selecting a transmission channel in the transmission band in which the measured noise level is lower than a prescribed threshold; a second noise level measuring unit configured to measure a noise level in a reception band which can be used for communication from said second radio base station to said first radio base station; and a reception channel selector for selecting a reception channel in the reception band in which the measured noise level is lower than a prescribed threshold, whereby the selection of the channel for transmission by said transmission channel selector and the selection of the channel for reception by said reception channel selector are independently determined.

According to the third aspect of the present invention, there is provided a radio communication system for performing communication between radio base stations, comprising: a first noise level measuring unit configured to measure a noise level in a transmission band which can be used for communication performed from a first radio base station to a second radio base station; a transmission channel selector for selecting a transmission channel in the transmission band in which the measured noise level is lower than a prescribed threshold; a second noise level measuring unit configured to measure a noise level in a reception band which can be used for communication from said second radio base station to said first radio base station; a reception channel selector for selecting a reception channel in the reception band in which the measured noise level is lower than a prescribed threshold; and a communication channel setting unit configured to set the transmission channel selected by the transmission channel selector and the reception channel selected by the reception channel selector as communication channels between said radio base stations, whereby the selection of the transmission channel by said transmission channel selector and the selection of the reception channel by said reception channel selector are independently determined.

DETAILED DESCRIPTION OF THE INVENTION

The present invention can be applied to a radio communication system that performs communication between base stations providing communication services with respect to, for example, portable terminal devices.

(Configuration)

Figure 1:
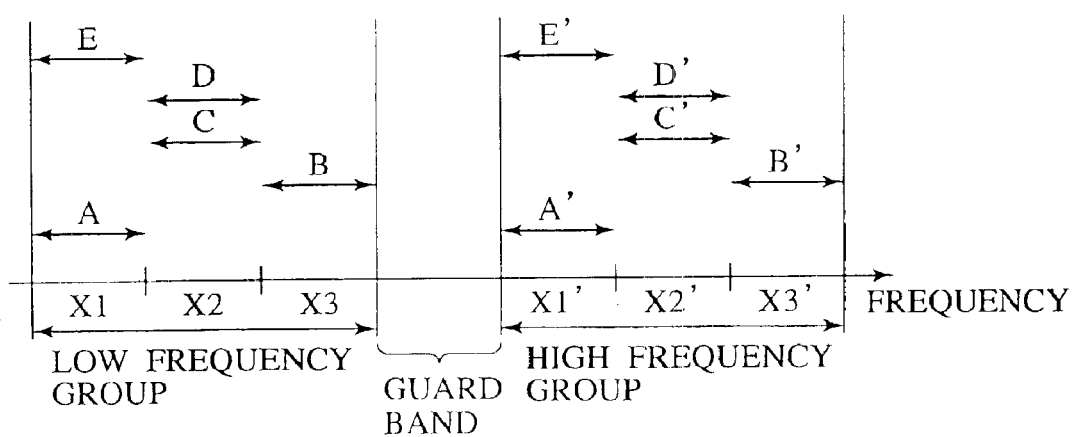
FIG. 1 is a view illustrating assignment processing for assigning communication channels in a conventional radio communication system.
Figure 2:
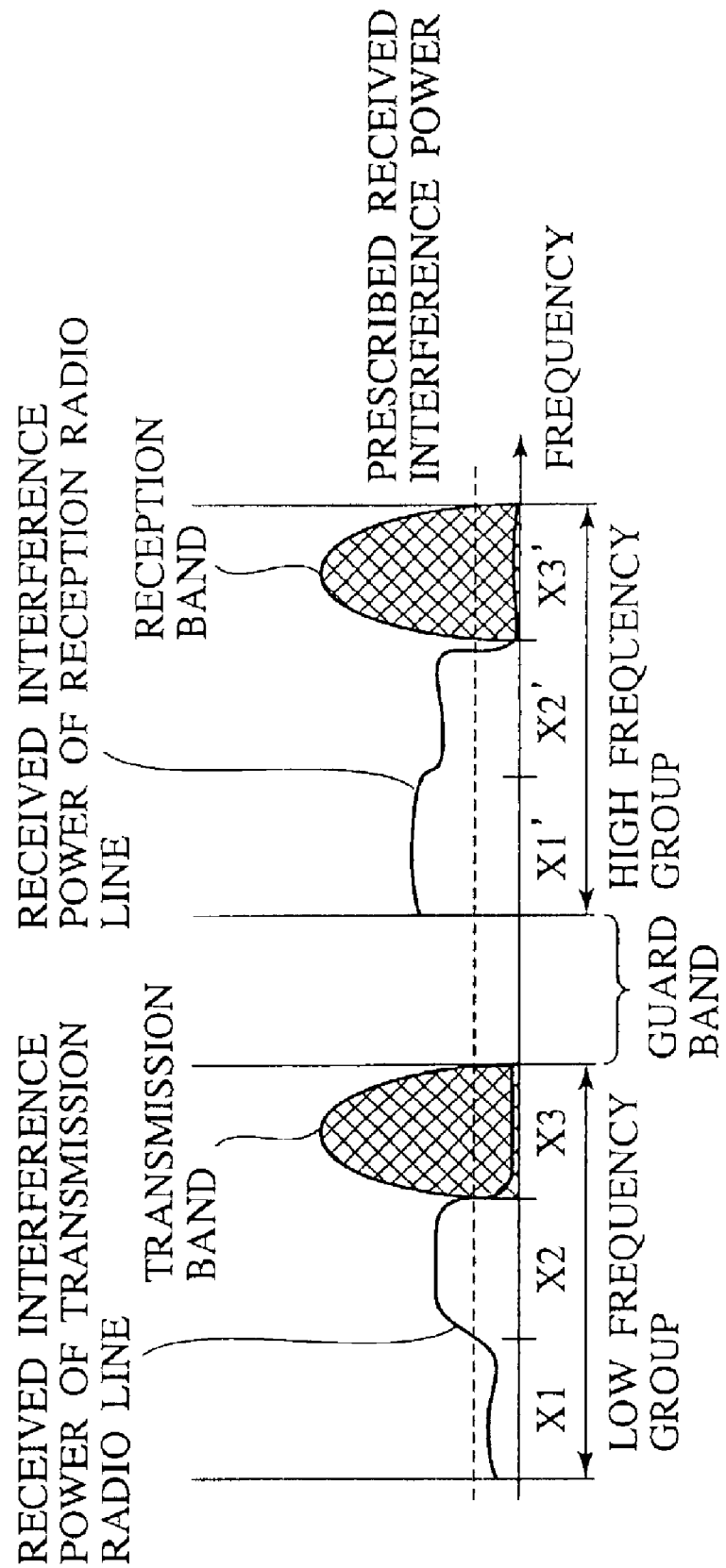
FIG. 2 is a view illustrating assignment processing for assigning communication channels in a conventional radio communication system.
Figure 3:
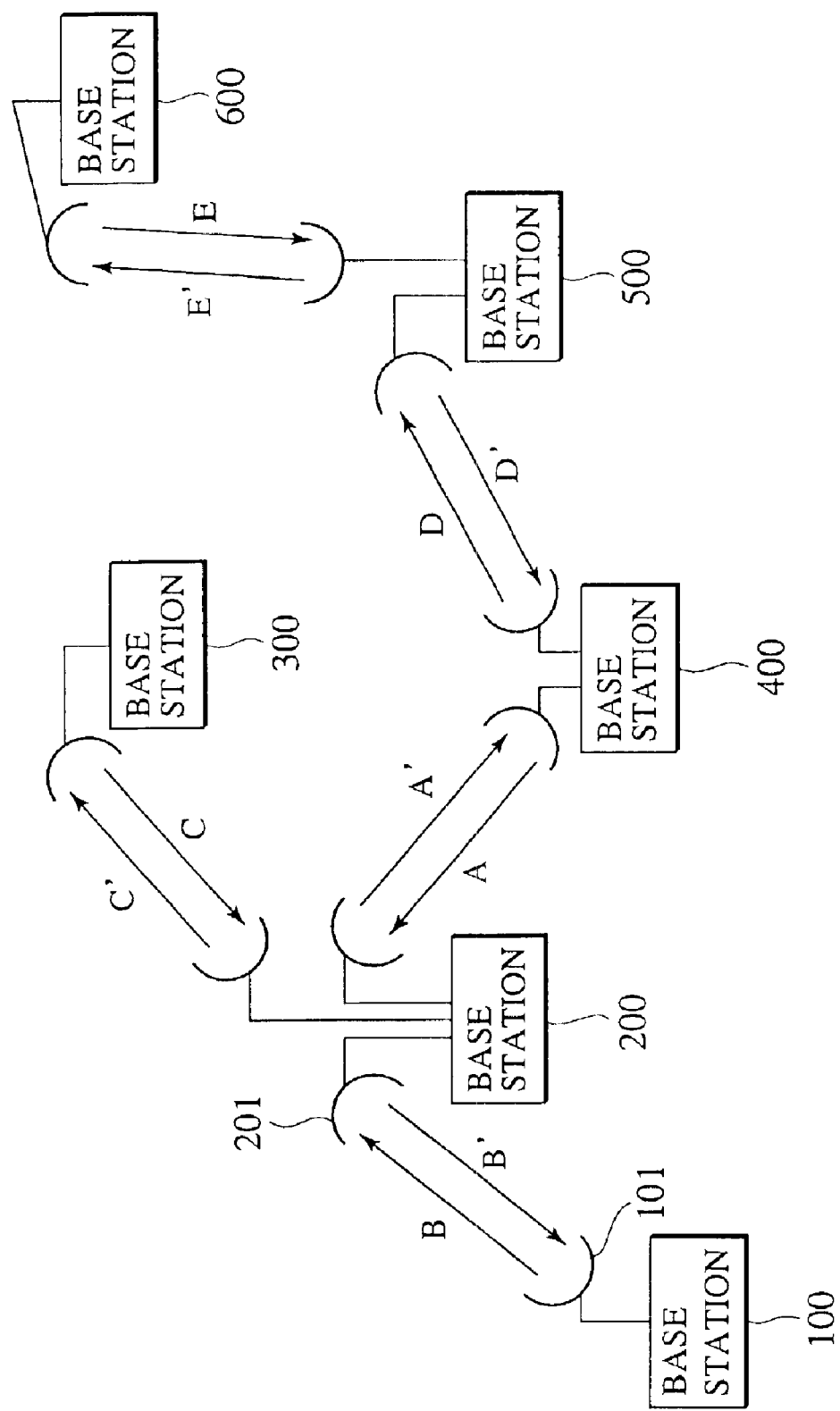
FIG. 3 is a block diagram illustrating a configuration of a radio communication system according to an embodiment of the present invention.

This radio communication system is equipped with a plurality of base stations 100, 200, 300, 400, 500, and 600, for example, as illustrated in FIG. 3.

Each of these base stations 100, 200, etc. are deployed for each prescribed cell provided within a service providing area providing communication services, for example, to portable terminal devices. The respective base stations 100, 200, etc. are arranged to be able to perform communications by using their corresponding radio lines A, A', B, B', etc. Corresponding pairs of radio lines A and A', B and B', etc. indicate a transmission line and a corresponding reception line, respectively for one of the base stations.

Figure 4:
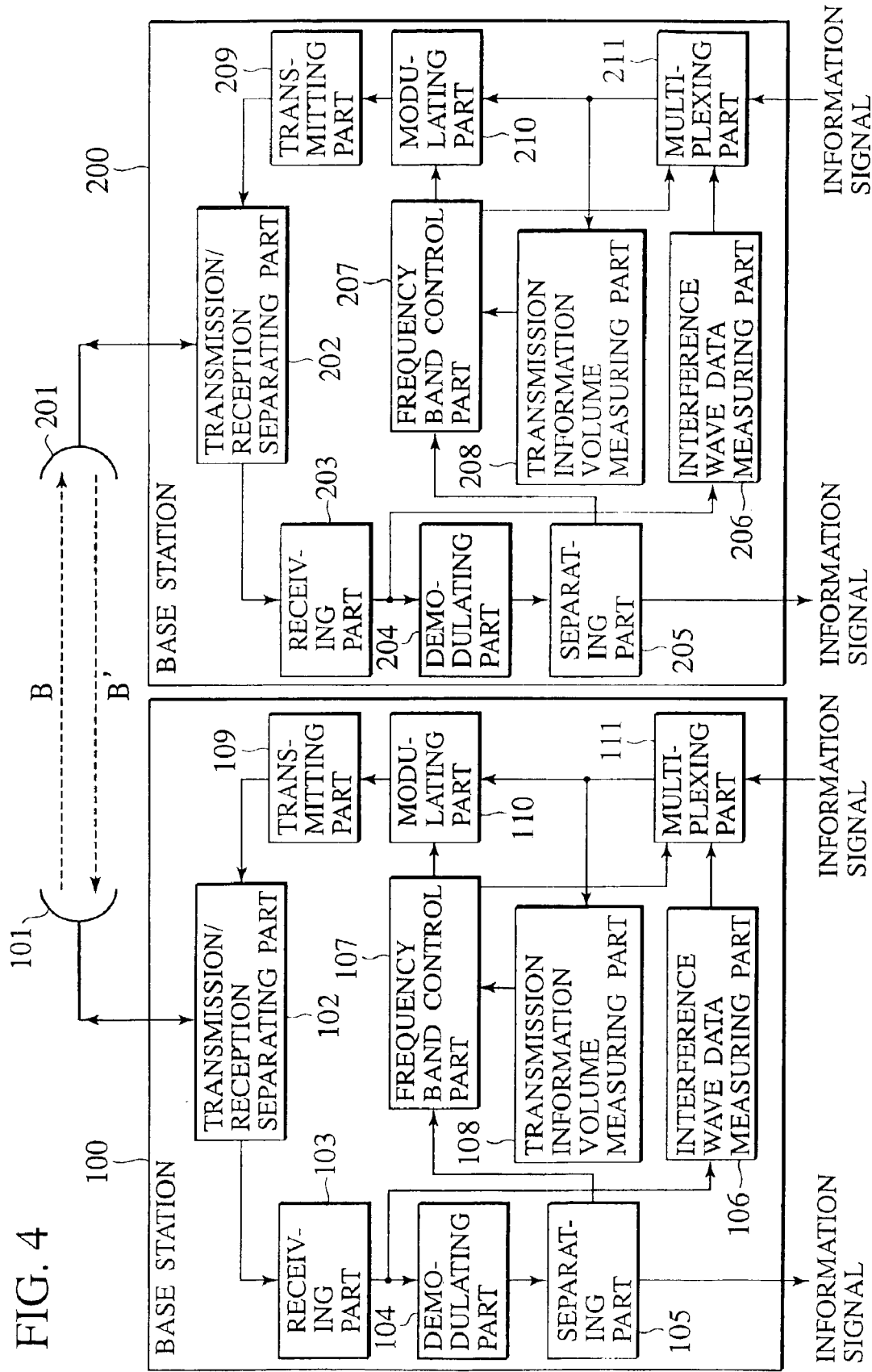
FIG. 4 is a view illustrating configurations of radio base stations configuring the radio communication system.

As illustrated in FIG. 4, for example, the base station 100 includes an antenna 101, a transmission/reception separating part 102, a receiving part 103, a demodulating part 104, a separating part 105, an interference wave data measuring part 106, a frequency band controlling part 107, a transmission information volume measuring part 108, a transmitting part 109, a modulating part 110, and a multiplexing part 111.

The antenna 101 performs transmission/reception of the radio waves. The transmission/reception separating part 102 separates a transmission signal and a reception signal. The receiving part 103 performs the adjustment of the amplitude of the reception signal, etc. The demodulating part 104 reproduces a baseband signal from the reception signal. The separating part 105 separates the reproduced baseband signal into an information signal and a control signal. The interference wave data measuring part 106 measures the frequency and the power of the interference wave. The frequency band controlling part 107 executes the control of the frequency for the communication channel, etc. The transmission information volume measuring part 108 measures the amount of information that is to be forwarded. The transmitting part 109 executes processes such as the adjustment of the amplitude of the transmission signal, the suppression of spurious components, etc. The modulating part 110 forms a transmission signal, supplied to the transmitting part 109, according to the information to be forwarded, etc. The multiplexing part 111 multiplexes information supplied by the frequency band controlling part 107 that indicates the frequency, bandwidth, etc. of the communication channel, the output signal for measurement from the interference wave data measuring part 106, and an information signal supplied by an outside device, etc.

A base station 200 which performs communication with the base station 100 includes, similar to the base station 100, an antenna 201, a transmission/reception separating part 202, a receiving part 203, a demodulating part 204, a separating part 205, an interference wave data measuring part 206, a frequency band controlling part 207, a transmission information volume measuring part 208, a transmitting part 209, a modulating part 210, and a multiplexing part 211.

The antenna 201 performs transmission/reception of the radio waves. The transmission/reception separating part 202 separates a transmission signal and a reception signal. The receiving part 203 performs the adjustment of the amplitude of the reception signal, etc. The demodulating part 204 reproduces a baseband signal from the reception signal. The separating part 205 separates the reproduced baseband signal into an information signal and a control signal. The interference wave data measuring part 206 measures the frequency and received power of the interference wave. The frequency band controlling part 207 executes the control of the frequency for the communication channel, etc. The transmission information volume measuring part 208 measures the amount of information that is to be forwarded. The transmitting part 209 executes processes such as the adjustment of the amplitude of the transmission signal, suppression of spurious components, etc. The modulating part 210 forms a transmission signal, supplied to the transmitting part 209, according to the information to be forwarded, etc. The multiplexing part 211 multiplexes information supplied by the frequency band controlling part 207 that indicates the frequency, bandwidth, etc. of the communication channel, the output signal for measurement from the interference wave data measuring part 206, and an information signal supplied by an outside device, etc.

(Outline of the Operation)

In the radio communication system configured in the above-described way, when performing communication between the base station 100 and the base station 200, a radio line used for transmission from the base station 100 to the base station 200 (referred to as "the transmission line" for convenience of explanation) and a radio line used for transmission from the base station 200 to the base station 100 (referred to as "the reception line" for convenience of explanation) are set as the communication channels according to the prescribed procedures carried out between the frequency band controlling part 107 and the frequency band controlling part 207. Thereafter, communications start between the both base stations.

The signal which the base station 100 receives from the base station 200 via the antenna 101 is supplied to the receiving part 103 via the transmission/reception separating part 102. The reception signal of which the receiving part 103 performes adjustment of the amplitude, etc. is supplied to the demodulating part 104, and then the signal is demodulated, thereby reproducing a baseband signal. The baseband signal thus reproduced is supplied to the separating part 105 and the signal is separated into an information signal from the base station 200 to the base station 100, a control signal that contains information indicating the frequency, etc. of the radio line (the reception line) from the base station 200 to the base station 100, and information indicating the power, etc. of the interference wave received by the antenna 201. The control signal is supplied to the frequency band controlling part 107 while the information signal is supplied to an outside device.

The interference wave data measuring part 106 measures the frequency and received power of the interference wave in the signal received by the receiving part 103 and information indicating these measured result is supplied to the multiplexing part 111.

The frequency band controlling part 107 produces information such as the frequency of the transmission line and supplies it to the multiplexing part 111. In addition, an information signal, etc. from an outside device is supplied to the multiplexing part 111.

The transmission information volume measuring part 108 measures the amount of information multiplexed by the multiplexing part 111 and supplies the measured results to the frequency band controlling part 107.

The frequency band controlling part 107 controls the frequency and bandwidth of the transmission signal formed by the modulating part 110, according to the information indicating the frequency of the communication channel, etc. which is supplied by the separating part 105, the amount of information to be forwarded which is supplied by the transmission information volume measuring part 108, and the information indicating the power of the interference wave received by the antenna 201 and supplied by the separating part 105. Specifically, for example, the frequency band controlling part 107 sets the transmission line to a frequency band with an interference wave of less power than a prescribed threshold (the prescribed received power of the interference wave) and which is different to a frequency band for the radio line (the reception line) used from the base station 200 to the base station 100. This prescribed received power of the interference wave is set, for example, according to the communication requirements for this radio communication system (e.g. the CN ratio [Carrier to Noise Ratio, the ratio of carrier to noise]; the SIR [Signal to Interference Ratio, the ratio of signal to interference], QoS [Quality of Service]; and so on). The modulating part 110 forms a transmission signal conforming to the information multiplexed by the multiplexing part 111, according to the control by the frequency band controlling part 107, and the thus-produced transmission signal is supplied to the transmitting part 109.

The transmitting part 109 performs the adjustment of the amplitude of the supplied transmission signal and supplies the adjusted signal to the transmission/reception separating part 102. The transmission signal that has been supplied to the transmission/reception separating part 102 is supplied to the antenna 101, and then is transmitted to the base station 200 via the antenna 101.

In the base station 200, as well as the case of the base station 100, the reception signal received via the antenna 201 is supplied to the receiving part 203 via the transmission/reception separating part 202. The reception signal is demodulated by the demodulating part 204, thereby reproducing a baseband signal. By the separating part 205, the baseband signal thus reproduced is separated into an information signal and a control signal, which are supplied to the frequency band controlling part 207 and to an outside device, respectively.

The frequency band controlling part 207 produces information such as the frequency of the reception line and supplies it to the multiplexing part 211. In addition, information indicating the measured results of the interference wave data measuring part 206 and an information signal from an outside device, etc. are supplied to the multiplexing part 211.

The frequency band controlling part 207 controls the frequency and bandwidth of the transmission signal formed by modulating part 210, according to the information indicating the frequency of the communication channel, etc. which is supplied by the separating part 205, and the amount of information to be forwarded which is supplied by the transmission information volume measuring part 208, etc. The modulating part 210 forms a transmission signal conforming to the information multiplexed by the multiplexing part 211, according to the control by the frequency band controlling part 207, and the thus-produced transmission signal is supplied to the transmitting part 209.

The transmitting part 209 performs the adjustment of the amplitude of the supplied transmission signal and supplies the adjusted signal to the antenna 201 via the transmission/reception separating part 202. The antenna 201 is driven by the thus-supplied transmission signal, which is transmitted to the base station 100.

(Details of the Operation)

Moreover, in this radio communication system, the frequency of the transmission line and that of the reception line are controlled according to the frequency, power, etc. of the interference wave. The bandwidths for the transmission line and reception line are controlled according to the amount of information to be forwarded (more exactly the amount of information per unit amount of time).

Figure 5:
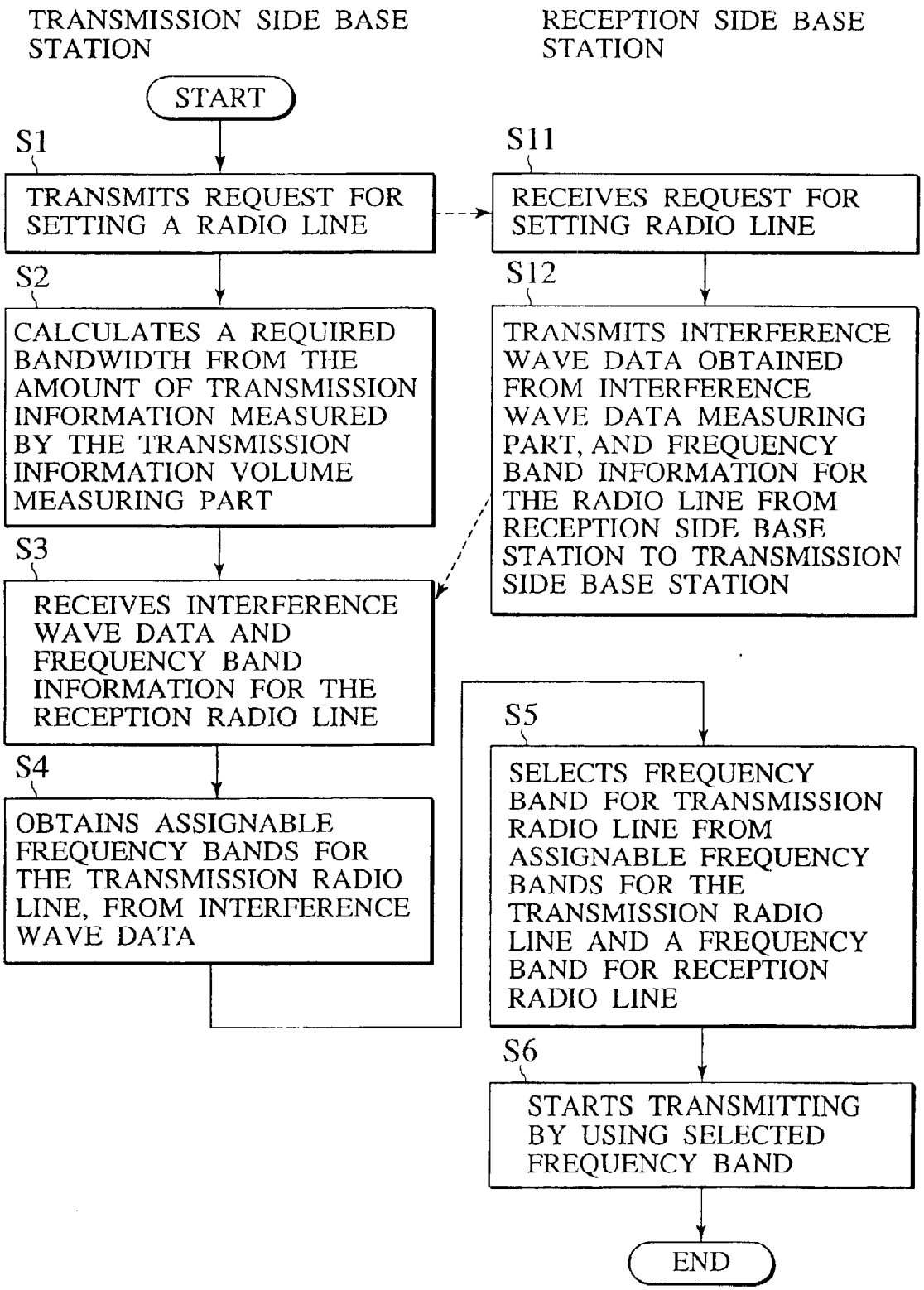
FIG. 5 is a flow chart illustrating the assignment processing for assigning the communication channels in the radio communication system.

The above-described assignment processing for the communication channels which determines frequencies and bandwidths of the transmission line and reception line is executed, for example, according to the procedure illustrated in FIG. 5.

In FIG. 5, the steps of processing from step S1 to step S6 illustrate the process in a base station (transmission side base station) seeking to begin communication with another base station while the steps of processing from step S11 to step S12 illustrate the process from the reception side base station (reception side base station).

The frequency band controlling part 107 of the transmission side base station (e.g. the base station 100) first transmits information requesting the setting of a radio line to the reception side base station (e.g. the base station 200) (S1), and calculates a required bandwidth based on the amount of transmission information that was measured by the transmission information volume measuring part 108 (S2).

On the other hand, the reception side base station, when receiving the request for setting the radio line (S11), transmits to the transmission side base station information indicating the frequency, bandwidth, power, etc. of the interference wave, which has been measured by the interference wave data measuring part 206, and information indicating the frequency, bandwidth, etc. (frequency band information) which the reception side base station has assigned for the radio line (the reception line at the base station 100) for transmission from the reception side base station (S12).

Upon the receipt of such information by the transmission side base station (S3), the frequency band controlling part 107 of the transmission side base station determines the frequency and bandwidth assignable for the transmission line to the reception base station based on the received information indicating the frequency, band, power, etc. of the interference wave at the reception side base station (S4). Specifically, the frequency band controlling part 107 determines, for example, the frequency and bandwidth at which the power of the interference wave is smaller than a prescribed threshold, and which are treated as the frequency and bandwidth assignable.

Further, the frequency band controlling part 107 selects the frequency and bandwidth for the transmission line in view of the determined assignable frequency/bandwidth, and the frequency/bandwidth applicable to the reception line (S5).

After the frequency and bandwidth for the transmission line and reception line are determined in the above-described way, the transmission side base station starts transmission using these lines as the communication channels (S6). Then, the assignment processing for the communication channels at the transmission side base station is completed.

In this radio communication system, by executing the above-described processing steps, to set the radio line (e.g. the transmission line at the transmission side base station), it is possible to determine the frequency band according to the amount of information to be forwarded (exactly the amount of information per unit amount of time), the power and frequency of the interference wave at the opposite side base station, and the frequency and bandwidth of the radio line used in the opposite direction (the reception line at the transmission side base station).

As a result of this, in this radio communication system, the frequency and bandwidth for each of the transmission and reception lines can be set independently. Therefore, available frequencies can be properly utilized for the transmission and reception lines with the result that it is possible to contribute to enhancing frequency utilization efficiency.

In addition, in this radio communication system, it is possible to autonomously set the communication channels based on information such as the frequency, bandwidth, power, etc. of the interference wave at the base station at which each base station performs communication and information such as the frequency, bandwidth, etc. of the radio line which the opposite side base station has set. Therefore, for example, centralized management of the communication channel between respective base stations, which is applicable to controlling of communication channels between the mobile station and the base station, is not required. This can contribute to decreasing the control load of the entire system.

Incidentally, the above-described assignment processing for the communication channel can also be applied, for example, to changing the communication channel if the amount of information to be forwarded has changed, in addition to setting of the communication channel at the start of communication.

Further, although the procedure of setting a transmission line from one base station (e.g. the base station 100) to another base station (e.g. the base station 200) has only been described in the above-described assignment processing for communication channels, it is possible to set communication channels bi-directionally between base stations by exchanging the transmission side base station and the reception side base station, and exchanging assignment processing in accordance with the same procedure.

Meanwhile, the frequency and bandwidth (hereinafter referred to simply as "the frequency band") for the transmission line at the step S5 in FIG. 5 are selected based on the assignable frequency band for the transmission line which can be determined by the frequency, bandwidth and the power of the interference wave, the bandwidth of the transmission line, and the frequency band of the reception line. Several methods of selecting the frequency band for the radio line can be considered, as is shown below.

(1) Narrowing the interval between the transmission line and the reception line as much as possible.

Figure 6:
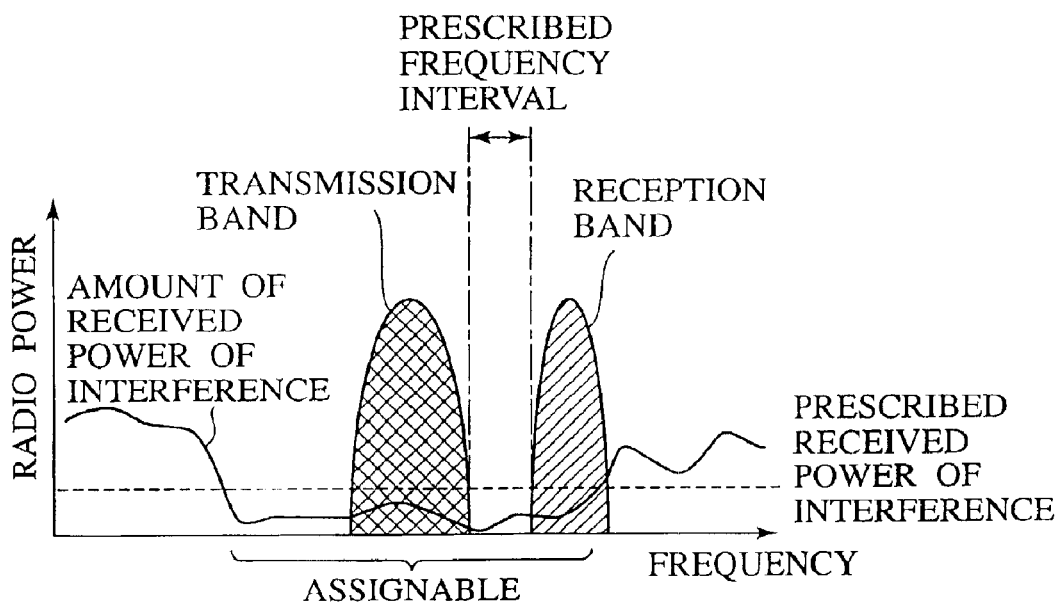
FIG. 6 is a view illustrating the assignment processing for assigning the communication channels in the radio communication system.

As illustrated in FIG. 6 for example, in a case where the frequency band for the reception line has been set to an assignable frequency band for the transmission line, the frequency band controlling part 107 selects a frequency band for the transmission line distant from a prescribed frequency interval from the frequency band for the reception line.

Figure 7:
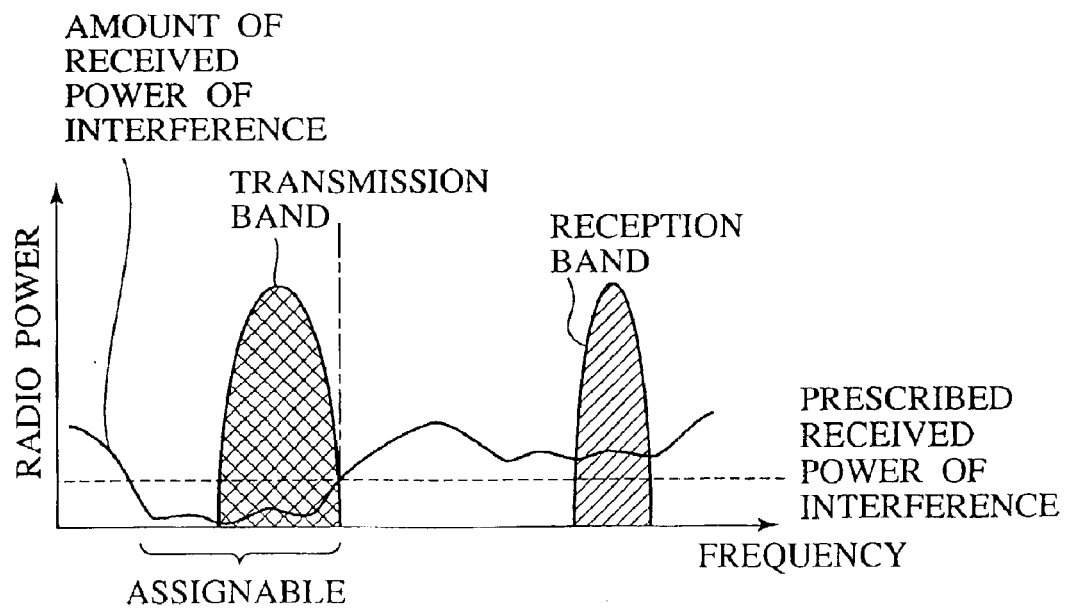
FIG. 7 is a view illustrating the assignment processing for assigning the communication channels in the radio communication system.

In this case, as illustrated in FIG. 7 for example, there exists a prescribed frequency interval or more than the interval between the frequency bands for the transmission line and the reception line, the frequency band controlling part 107 selects a frequency band of the transmission line, which minimizes a frequency interval to the frequency band for the reception line.

Figure 8:
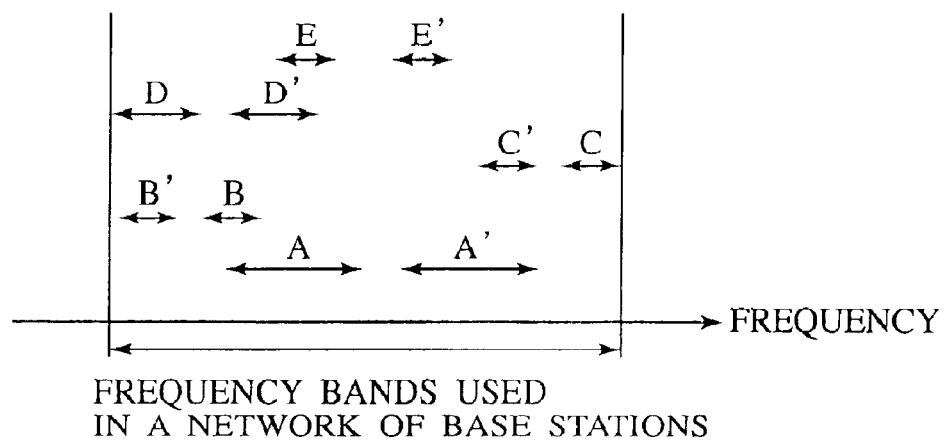
FIG. 8 is a view illustrating the assignment processing for assigning the communication channels in the radio communication system.

By the above-described setting of the frequency band for the transmission line, as illustrated in FIG. 8, for example, the frequency band for the transmission line and that for the reception line become vicinal to each other, with the result that frequency utilization efficiency is enhanced. Accordingly, for example, it is possible to decrease the frequency band required for the entire radio communication system.

It is noted that since the directionality of the antenna used in the base station is set to be sharp enough to perform communication with the opposite side base station in this radio communication system, no radio interference occurs even if the radio lines of A and B, D' or E, of which each frequency band overlaps each other, are set simultaneously.

Figure 9:
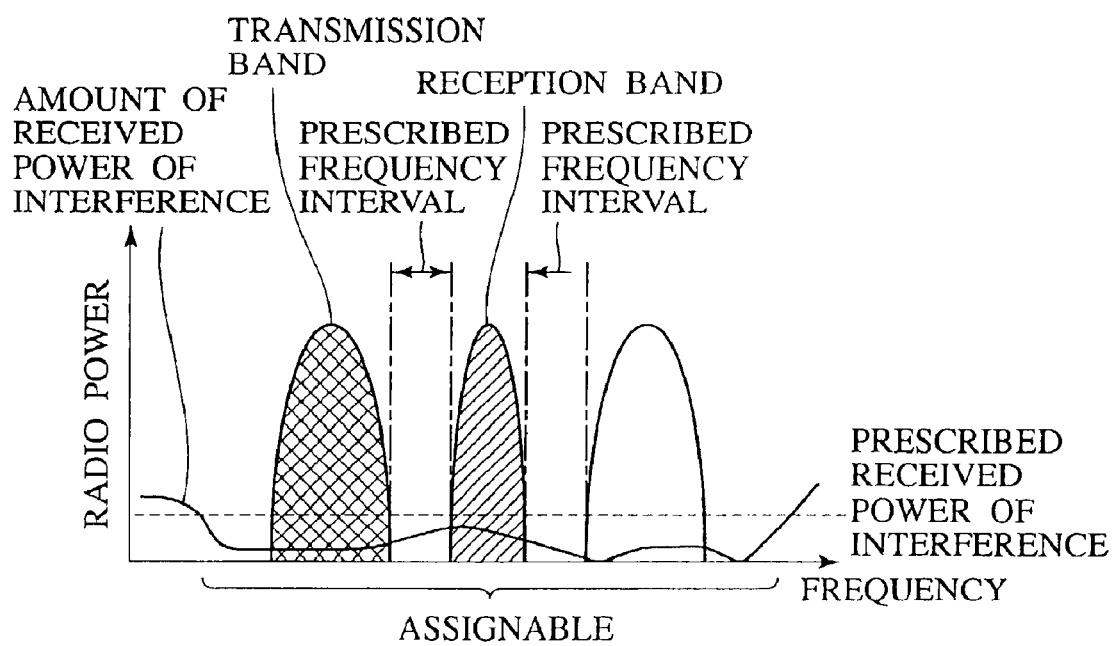
FIG. 9 is a view illustrating the assignment processing for assigning the communication channels in the radio communication system.
Figure 10:
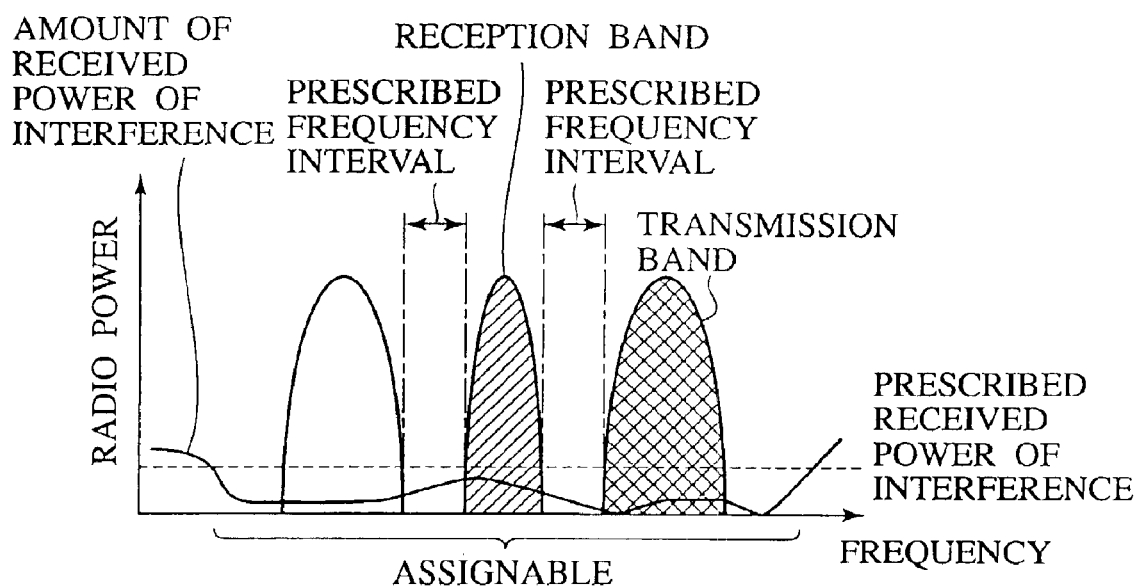
FIG. 10 is a view illustrating the assignment processing for assigning the communication channels in the radio communication system.

Meanwhile, there is a case where two frequency band having the prescribed frequency interval from the frequency band of the reception line, and the narrowest possible frequency interval are available for the transmission line. In this case, the frequency band whose frequency is lower than the reception line is selected as the transmission line as illustrated in FIG. 9 for example, or the frequency band whose frequency is higher than the reception line is selected as the transmission line as illustrated in FIG. 10 for example.

Whether the frequency band whose frequency is low or high is selected depends upon the location of the base station and the circumstances of the other radio communication system using adjacent frequencies, etc. Alternatively, the selection of the frequency band may be actively changed according to the circumstances.

(2) Assigning the frequency band whose frequency is the lowest of the assignable frequency bands.

Figure 11:
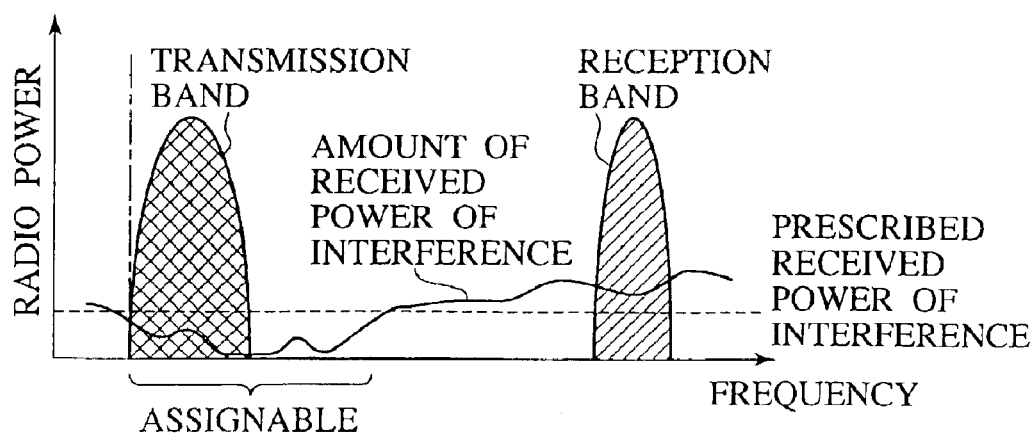
FIG. 11 is a view illustrating the assignment processing for assigning the communication channels in the radio communication system.

As illustrated in FIG. 11 for example, in a case where more than a prescribed frequency interval exists between the lowest frequency in the assignable frequency band for the transmission line and the frequency band for the reception line, the frequency band controlling part 107 selects the frequency band for the transmission line whose frequency is the lowest of the assignable frequency bands.

Figure 12:
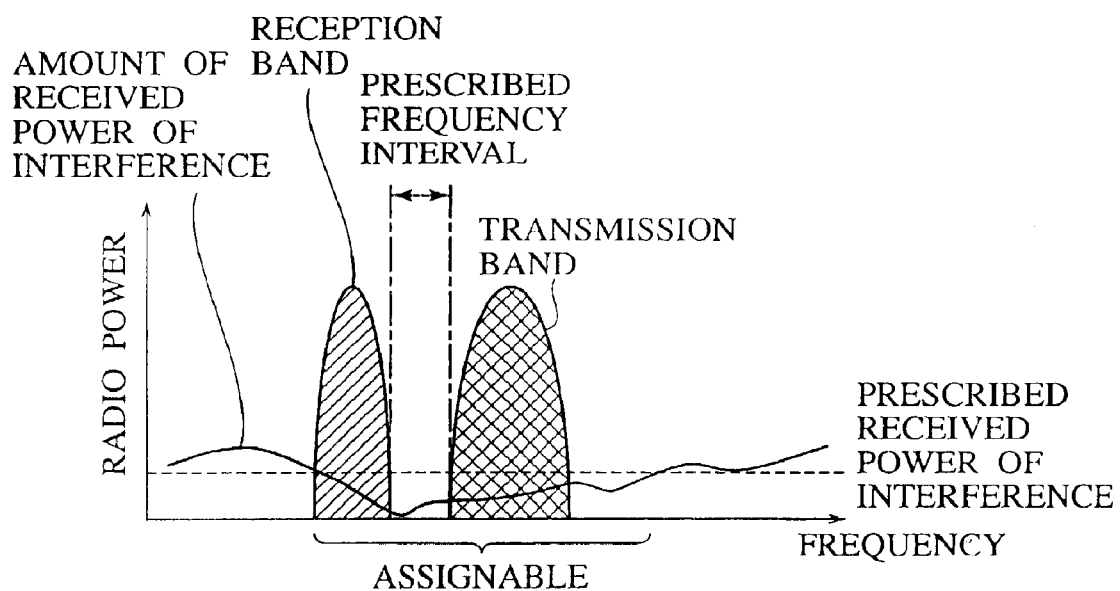
FIG. 12 is a view illustrating the assignment processing for assigning the communication channels in the radio communication system.

As a result, as illustrated in FIG. 12 for example, in a case where the frequency band for the reception line is set to the lowest frequency of the assignable frequency band for the transmission line, the frequency band having the prescribed frequency interval from the frequency band for the reception line is selected as the frequency band for the transmission line.

Figure 13:
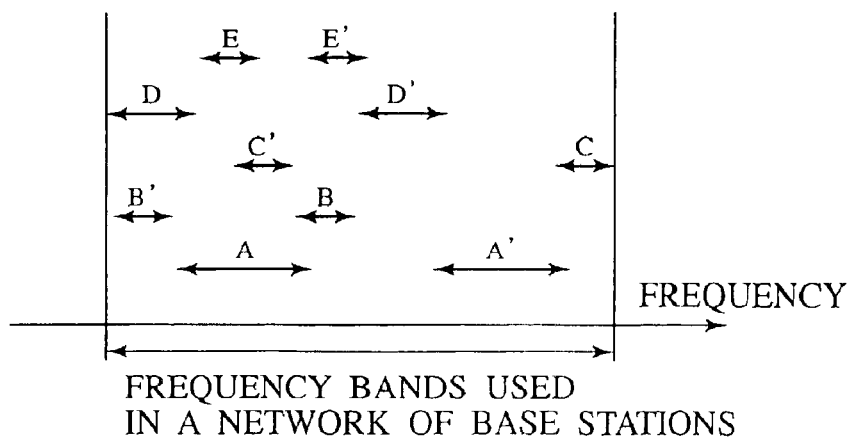
FIG. 13 is a view illustrating the assignment processing for assigning the communication channels in the radio communication system.

By the above-described assignment processing of the frequency band for the transmission line, the frequency band whose frequency is the lowest is selected as the frequency band for each radio line, resulting in efficient frequency assignment as illustrated in FIG. 13 for example. This can contribute to enhancing frequency utilization efficiency.

(3) Assigning the frequency band whose frequency is the highest of the assignable frequency bands.

Figure 14:
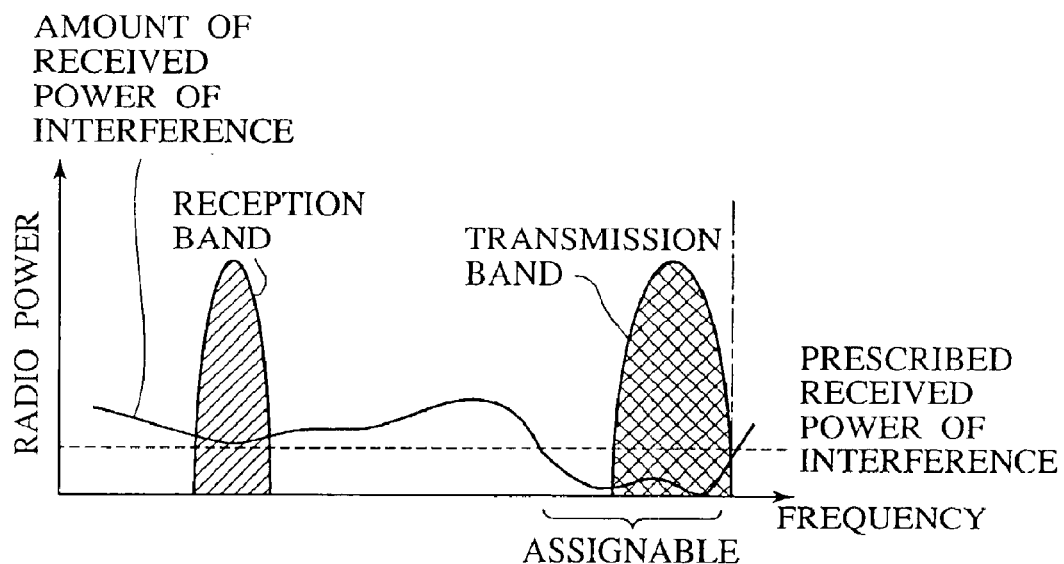
FIG. 14 is a view illustrating the assignment processing for assigning the communication channels in the radio communication system.

As illustrated in FIG. 14 for example, in a case where more than a prescribed frequency interval exists between the highest frequency in the assignable frequency band for the transmission line and the frequency band for the reception line, the frequency band controlling part 107 selects the frequency band for the transmission line whose frequency is the highest of the assignable frequency bands.

Figure 15:
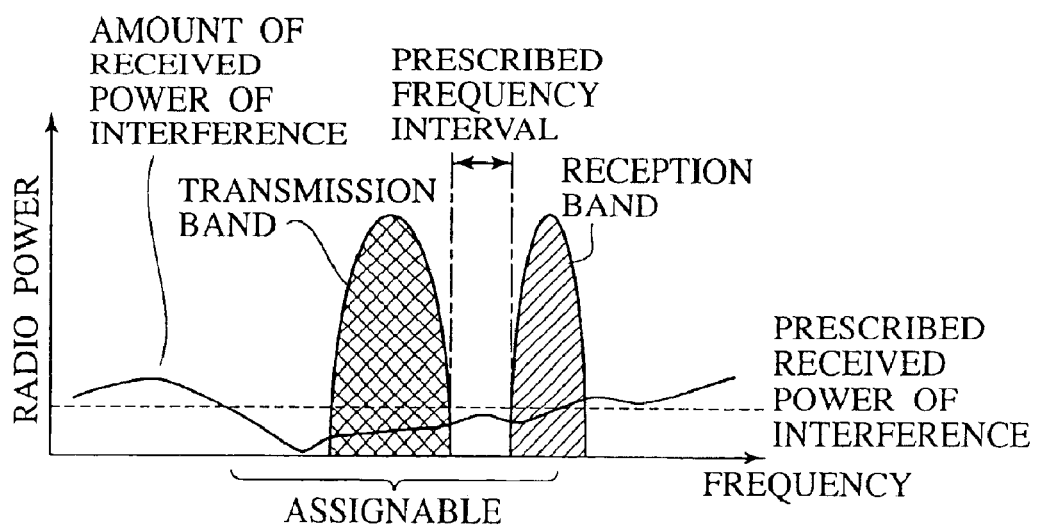
FIG. 15 is a view illustrating the assignment processing for assigning the communication channels in the radio communication system.

As a result of this, as illustrated in FIG. 15 for example, in a case where the frequency band for the reception line is set to the highest frequency of the assignable frequency band for the transmission line, the frequency band having the prescribed frequency interval from the frequency band for the reception line is selected as the frequency band for the transmission line.

Figure 16:
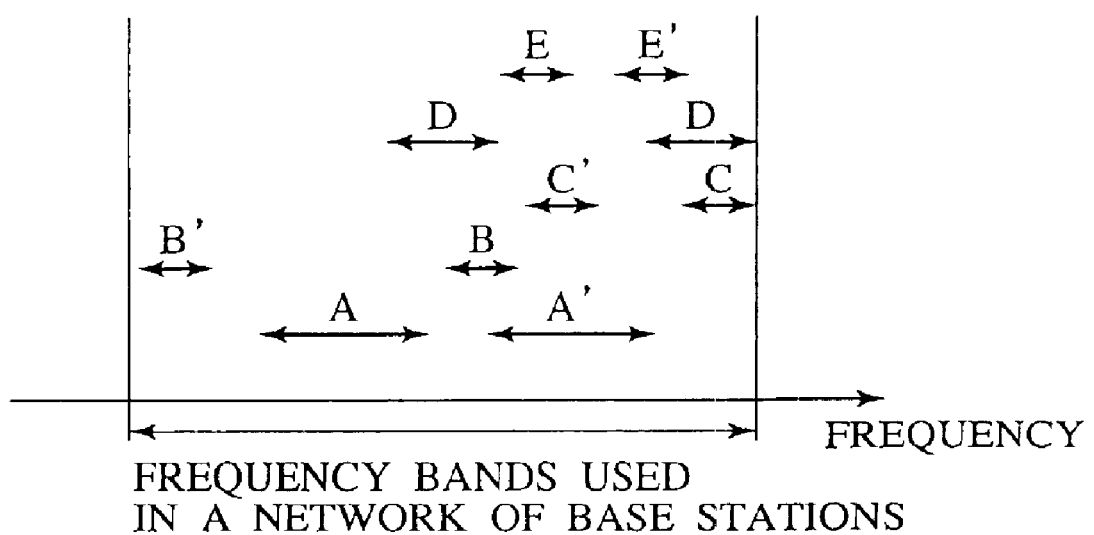
FIG. 16 is a view illustrating the assignment processing for assigning the communication channels in the radio communication system.

By the above-described assignment processing of the frequency band for the transmission line, the frequency band whose frequency is the highest is selected as the frequency band for each radio line, resulting in efficient frequency assignment as illustrated in FIG. 16 for example. This can contribute to enhancing frequency utilization efficiency.

(Modification)

Moreover, in the above-described embodiment, the present invention has been applied to communications in a network of base stations providing communications services to portable terminal devices is explained, the technical idea of the present invention is not limited to such embodiment. For instance, the present invention can also be applied to the communications between a base station and a portable terminal device.

The communication channel setting method of the present invention comprises measuring noise levels in a transmission band which can be used for communication from a first base station to a second radio base station, selecting a transmission channel in the transmission band in which the measured noise level is lower than a prescribed threshold, measuring noise levels in a reception band which can be used for communication from the second radio base station to the first base station, and selecting a reception channel in the reception band in which the measured noise level is lower than a prescribed threshold independent of the transmission channel.

As a result, it is possible for the setting of the channel for transmission and the channel for reception to be independent of each other.

In a case that the frequency relationship between the channel for transmission and the channel for reception is kept fixed, when the noise level in any one of the channels is higher than a prescribed threshold, neither channel can be used. In contrast to this, since the channel for transmission and the channel for reception are independently set, the present invention can contribute to enhancing channel utilization efficiency.

In addition, in the present invention, the bandwidth for the transmission channel and the bandwidth for the reception channel are set according to the transmission rate of data to be forwarded. This enables the necessary and minimum band to be used and it contributes to enhancing frequency utilization efficiency.

Although the present invention has been explained above in detail through the use of an embodiment, that the present invention is not limited to such embodiment explained in the specification of this application will be apparent to those skilled in the art. The present invention can be exercised as a modified or changed form without departing from the subject matter and scope of the invention as described in the accompanying claims. Accordingly, the description of this application is not limited and is only illustrative.

What is claimed is:

1. A communication channel setting method for setting a communication channel used for communication between radio base stations, comprising the steps of:

(A) measuring a noise level in a transmission band which can be used for communication from a first radio base station to a second radio base station;

(B) selecting a transmission channel in the transmission band in which the measured noise level is lower than a prescribed threshold;

(C) measuring a noise level in a reception band which can be used for communication from said second radio base station to said first radio base station;

(D) selecting a reception channel in the reception band in which the measured noise level is lower than a prescribed threshold; and (E) determining said transmission channel and said reception channel independently.

2. A communication channel setting method according to claim 1, wherein the step (B) comprises the selection of said transmission channel by giving priority to a channel, distant by more than a prescribed frequency interval from said reception channel and having a frequency nearest to the frequency band of said reception channel, from among channels lower in said measured noise level than a prescribed threshold.

3. A communication channel setting method according to claim 1, wherein the step (D) comprises the selection of said reception channel by giving priority to a channel, distant by more than a prescribed frequency interval from said transmission channel and having a frequency nearest to the frequency band of said transmission channel, from among channels lower in said measured noise level than a prescribed threshold.

4. A communication channel setting method according to claim 1, wherein the step (B) comprises the selection of said transmission channel by giving priority to a channel, distant by more than a prescribed frequency interval from said reception channel and having the lowest frequency in said transmission band, from among channels lower in said measured noise level than a prescribed threshold.

5. A communication channel setting method according to claim 1, wherein the step (D) comprises the selection of said reception channel by giving priority to a channel, distant by more than a prescribed frequency interval from said transmission channel and having the lowest frequency in said reception band, from among channels lower in said measured noise level than a prescribed threshold.

6. A communication channel setting method according to claim 1, wherein the step (B) comprises the selection of said transmission channel by giving priority to a channel, distant by more than a prescribed frequency interval from said reception channel and having the highest frequency in said transmission band, from among channels lower in said measured noise level than a prescribed threshold.

7. A communication channel setting method according to claim 1, wherein the step (D) comprises the selection of said reception channel by giving priority to a channel, distant by more than a prescribed frequency interval from said transmission channel and having the highest frequency in said reception band, from among channels lower in said measured noise level than a prescribed threshold.

8. A communication channel setting method according to claim 1, wherein, the bandwidth of said transmission channel or the bandwidth of said reception channel is set according to the transmission rate of data which is to be forwarded.

9. A communication controller for setting a communication channel used for communication between radio base stations, comprising:
a first noise level measuring unit configured to measure a noise level in a transmission band which can be used for communication from a first radio base station to a second radio base station;
a transmission channel selector for selecting a transmission channel in the transmission band in which the measured noise level is lower than a prescribed threshold;
a second noise level measuring unit configured to measure a noise level in a reception band which can be used for communication from said second radio base station to said first radio base station; and
a reception channel selector for selecting a reception channel in the reception band in which the measured noise level is lower than a prescribed threshold, whereby
the selection of the channel for transmission by said transmission channel selector and the selection of the channel for reception by said reception channel selector are independently determined.

10. A communication controller according to claim 9, wherein, said transmission channel selector comprises the selection of said transmission channel by giving priority to a channel, distant by more than a prescribed frequency interval from said reception channel and having a frequency nearest to the frequency band of said reception channel, from among channels lower in said measured noise level than a prescribed threshold.

11. A communication controller according to claim 9, wherein, said reception channel selector comprises the selection of said reception channel by giving priority to a channel, distant by more than a prescribed frequency interval from said transmission channel and having a frequency nearest to the frequency band of said transmission channel, from among channels lower in said measured noise level than a prescribed threshold.

12. A communication controller according to claim 9, further comprising a bandwidth setting unit configured to set the bandwidth of said transmission channel or the bandwidth of said reception channel according to the transmission rate of data which is to be forwarded.

13. A radio communication system for performing communication between radio base stations, comprising:
a first noise level measuring unit configured to measure a noise level in a transmission band which can be used for communication performed from a first radio base station to a second radio base station;
a transmission channel selector for selecting a transmission channel in the transmission band in which the measured noise level is lower than a prescribed threshold;
a second noise level measuring unit configured to measure a noise level in a reception band which can be used for communication from said second radio base station to said first radio base station;
a reception channel selector for selecting a reception channel in the reception band in which the measured noise level is lower than a prescribed threshold; and
a communication channel setting unit configured to set the transmission channel selected by the transmission channel selector and the reception channel selected by the reception channel selector as communication channels between said radio base stations, whereby
the selection of the transmission channel by said transmission channel selector and the selection of the reception channel by said reception channel selector are independently determined.

14. A radio communication system according to claim 13, wherein, said transmission channel selector comprises the selection of said transmission channel by giving priority to a channel, distant by more than a prescribed frequency interval from said reception channel and having a frequency nearest to the frequency band of said reception channel, from among channels lower in said measured noise level than a prescribed threshold.

15. A radio communication system according to claim 13, wherein, said reception channel selector comprises the selection of said reception channel by giving priority to a channel, distant by more than a prescribed frequency interval from said transmission channel and having a frequency nearest to the frequency band of said transmission channel, from among channels lower in said measured noise level than a prescribed threshold.

16. A radio communication system according to claim 13, further comprising a bandwidth setting unit configured to set the bandwidth of said transmission channel or the bandwidth of said reception channel according to the transmission rate of data which is to be forwarded.

* * * * *